United States Patent [15] 3,651,490

Onoda et al. [45] Mar. 21, 1972

[54] THREE DIMENSIONAL MEMORY UTILIZING SEMICONDUCTOR MEMORY DEVICES

[72] Inventors: Katsuhiro Onoda; Ryo Igarashi; Toshio Wada; Sho Nakanuma; Toru Tsujide, all of Tokyo, Japan

[73] Assignee: Nippon Electric Co., Ltd., Tokyo, Japan

[22] Filed: June 8, 1970

[21] Appl. No.: 44,358

[30] Foreign Application Priority Data

June 12, 1969 Japan....................................44/46580
Aug. 18, 1969 Japan....................................44/65112

[52] U.S. Cl. ............................340/173 R, 307/238, 307/279
[51] Int. Cl...........................................................G11c 11/40
[58] Field of Search........................340/173 R; 307/238, 279

[56] References Cited

OTHER PUBLICATIONS

Brewer, D. E. et al., " Suitcase- size Memory for Longer Space Trips" In Electronics, 40 (24): Nov. 13, 1967 pp. 138–146 TK7800E56

*Primary Examiner*—Malcolm A. Morrison
*Assistant Examiner*—R. Stephen Dildine, Jr.
*Attorney*—Sandoe, Hopgood & Calimafde

[57] ABSTRACT

A three-dimensional memory includes MIS-type transistors as the memory elements formed on a plurality of integrated matrix boards. The transistor includes an insulating film capable of storing an electric charge in response to the application of a voltage across the gate and substrate exceeding a critical value. The row and column drive lines are respectively connected to row and column select circuitry, and a third select circuit applies a select voltage to one of the matrix boards.

14 Claims, 25 Drawing Figures

*INVENTORS*
KATSUHIRO ONODA
RYO IGARASHI
TOSHIO WADA
SHO NAKANUMA
TORU TSUJIDE
*by*
Sandoe, Hopgood & Calimafde
ATTORNEYS

*INVENTORS*
KATSUHIRO ONODA
RYO IGARASHI
TOSHIO WADA
SHO NAKANUMA
TORU TSUJIDE
*by*
Sandoe, Hopgood & Calimafde
ATTORNEYS

*INVENTORS*
KATSUHIRO ONODA
RYO IGARASHI
TOSHIO WADA
SHO NAKANUMA
TORU TSUJIDE
by
Sandoe, Hopgood & Calimafde
ATTORNEYS

*INVENTORS*
KATSUHIRO ONODA
RYO IGARASHI
TOSHIO WADA
SHO NAKANUMA
TORU TSUJIDE
by
Sandoe, Hopgood & Calimafde
ATTORNEYS

THREE DIMENSIONAL MEMORY UTILIZING SEMICONDUCTOR MEMORY DEVICES

This invention relates generally to memories employing semiconductor elements having memory function and, more, particularly, to a memory device for permitting three-dimensional addressing in a large scale integrated memory circuit wherein a plurality of integrated circuit memory boards are stacked or arranged on a common substrate.

Magnetic memory devices, memory devices utilizing flip-flops, and memory devices employing insulated gate type field-effect transistors (hereinafter denoted "MIS-type semiconductor element") having a metal—insulation film—semiconductor structure (hereinafter denoted "MIS structure") and utilizing a hysteresis characteristic appearing on the capacitance-voltage characteristic curve of a silicon nitride film, are all know for use as memory devices, that is, devices that can store data.

Among these memory devices, the magnetic memory device is not desirable for use in a large scale and high-speed memory device because this device is difficult to read at high-speeds, the connection to succeeding electronic circuits is complex, and the device does not permit significant miniaturization. Integrated circuits which improve these disadvantages include a bipolar type integrated circuit which is mainly employed in a high-speed memory device and, for a large capacity memory device, an insulated gate type field-effect integrated circuit (hereinafter denoted "MIS-type integrated circuit"). The bipolar type integrated circuit is of the type in which an epitaxial layer of an opposite conductivity type is grown over a silicon body of one conductivity type. Within this epitaxial layer are provided circuit elements such as transistors, diodes or resistors, which are electrically insulated by a diffusion layer of the same conductivity type as that of the body. This fabrication of bipolar type integrated circuits involves a complex manufacturing process because various diffusion processes must be performed. As a result the yield of non-defective units is low. This integrated circuit contains another disadvantageous point in that a considerable area of the epitaxial layer surface is occupied by a diffusion layer for insulation, and a large number of structural elements are needed for unit function.

On the other hand, the MIS-type integrated circuit employing an insulated gate type field-effect transistors considerable improves the degree of integralization because, in contrast to the bipolar type integrated circuit, it does not require the insulating diffusion region. However, since a field-effect transistor utilizes the same electronic circuit as that of the bipolar type integrated circuit, the number of the structural elements necessary for the unit memory function remains the same. For example, a flip-flop circuit for use with these integrated circuits for storing one bit consists of six circuit elements: two active elements, two load elements, and two coupling elements for external circuits. This large number of structural elements results in a significant reduction of functional capacity and a lowering of reliability and the fraction of non-defective units in the fabrication of semiconductor devices realizing a large scale integrated circuit.

An additional disadvantage of these integrated circuits is that stored information is completely destroyed upon failure or shutdown of the electric power source. It is desirable that stored information be preserved irrespective of power source shut-off, particularly, in order to reduce power consumption or in a high-speed read-only memory device which is expected to have a wide variety of uses.

In order to reduce the number of structural elements necessary for unit function, a MIS-type semiconductor device has been considered which employs a silicon nitride film as a gate insulating film. The capacitance-voltage curve of this MIS-type semiconductor device exhibits a hysteresis characteristic. In connection with the utilization of this MIS-type semiconductor device as a memory element, reference may be made to "Applied Physics Letters," vol. 12, No. 8, pages 260 through 263. This MIS-type semiconductor device is characterized in that, in response to the application of a voltage above a critical value to a gate electrode of the MIS structure with respect to a semiconductor body, the distribution of surface electric charge density of the semiconductor body immediately below the insulated gate film is caused to change, and a surface electric charge density of a certain value is maintained for a certain time interval. The holding action of this MIS structure results from the fact that electrons injected into a silicon nitride film are captured at a temporary trapping center existing therein. This holding action is easily lost by applying a reverse voltage to the metal electrode or through natural discharging.

An MIS structure which allows a more stable changing of the surface electric charge density of the semiconductor body is disclosed in co-pending application, No. 11,426 entitled MIS-Type Semiconductor Memory Device and Method of Manufacturing same. The structure disclosed in said application employs for example, a vapor deposited alumina film including a permanent trapping center. According to this improved MIS structure, a stable semiconductor memory element is provided which has a high noise margin and semi-permanently retains the induced electric charge on the semiconductor body.

A memory element made up from MIS-type semiconductor devices utilizing the memory action resulting from the trapping center to induce an electric charge at the surface of the semiconductor body is expected to be contributive to a decrease in the number of circuit elements necessary for unit memory function, and to an increase in the capacity of the memory device. However, in an enlarged scale memory device employing effectively those memory elements, no practical circuit has heretofore been realized which reliably effects storing operation to a given memory element with a reduced influence on the other elements, and which is easily connected to an external circuit.

It is an object of this invention to provide a memory device having a high reliability and a high degree of integralization.

It is another object of this invention to provide a large scale, three-dimensionally addressable memory device which has a simple structure, which is highly suitable for mass production techniques, and reduces the number of connection points with the external circuit.

It is still another object of this invention to provide a semiconductor memory device of the integrated circuit form capable of reliably and stably storing information permanently, or for a certain period of time.

According to this invention, a large scale memory device is provided which employs a plurality of memory matrix boards, wherein MIS-type transistors are employed as the unit memory elements. Each transistor has an insulating material film such as a silicon nitride film or alumina film capable of storing an electric charge in response to the application of an electric field exceeding a critical value between the semiconductor surface and a conductor gate electrode. The gate electrode is coupled electrically to a row drive line, and drain and source electrodes are coupled electrically to a column drive line and column output line. The row drive lines in the same row of the respective matrix boards are connected in common to form a first selection line group and the column drive lines in the same column are connected in common to form a second selection line group. A third selection line group is connected to an external circuit which consists of the body selection electrodes of individual matrix boards or of the body selection lines such as the output lines given by a board addressing system. Three-dimensional addressing can be thereby achieved through the first second and third selection line groups.

In comparison with a memory device which performs two-dimensional addressing through the row and column drive lines, the memory device of this invention can make a low number of circuit connections for connecting with the external circuit irrespective of an increase in memory capacity, and simplifies the structure of the external circuit.

To the accomplishment of the above, and to such further objects as may hereinafter appear, the present invention relates to a three-dimensional integrated circuit memory, substantially as defined in the appended claims, and as described in the following specification taken together with the accompanying drawings, in which:

Figure 2:
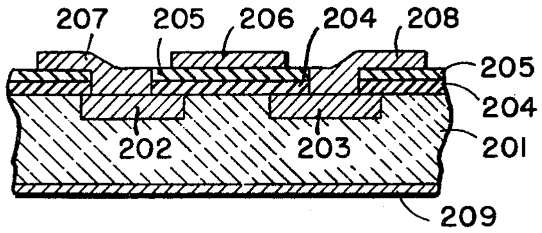
FIG. 2 is a cross sectional view of a semiconductor element that may be used to advantage in the memory of this invention.
Figure 5:
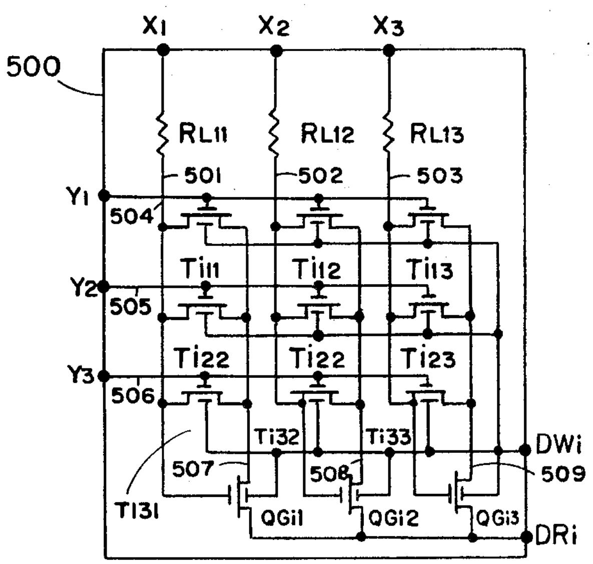
Figure 3A:
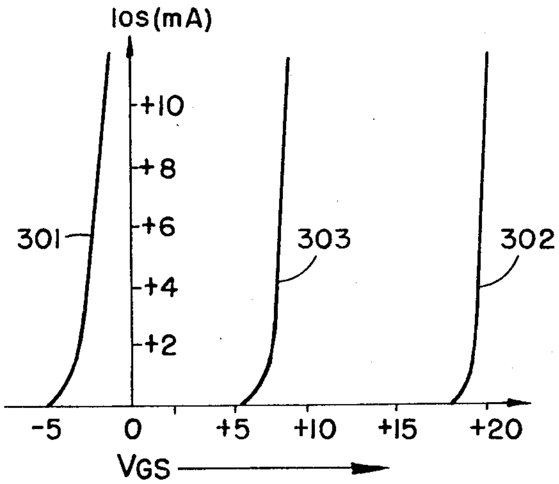
Figure 10:
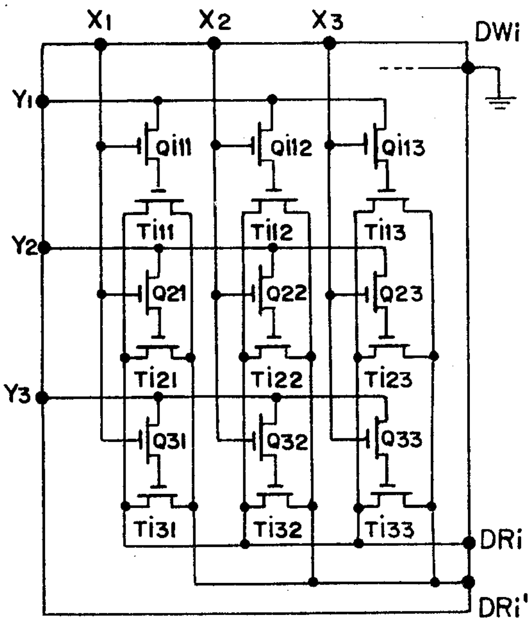
Figure 3B:
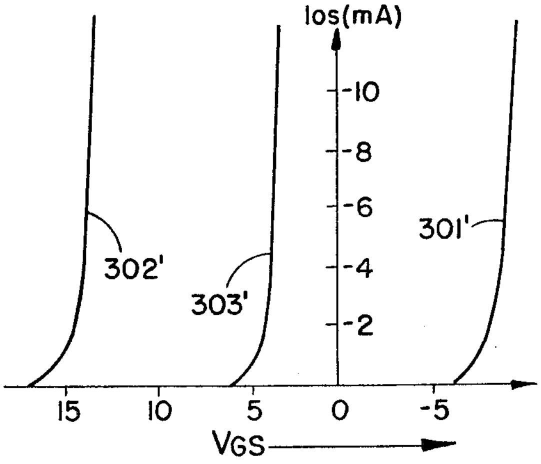
Figure 4:
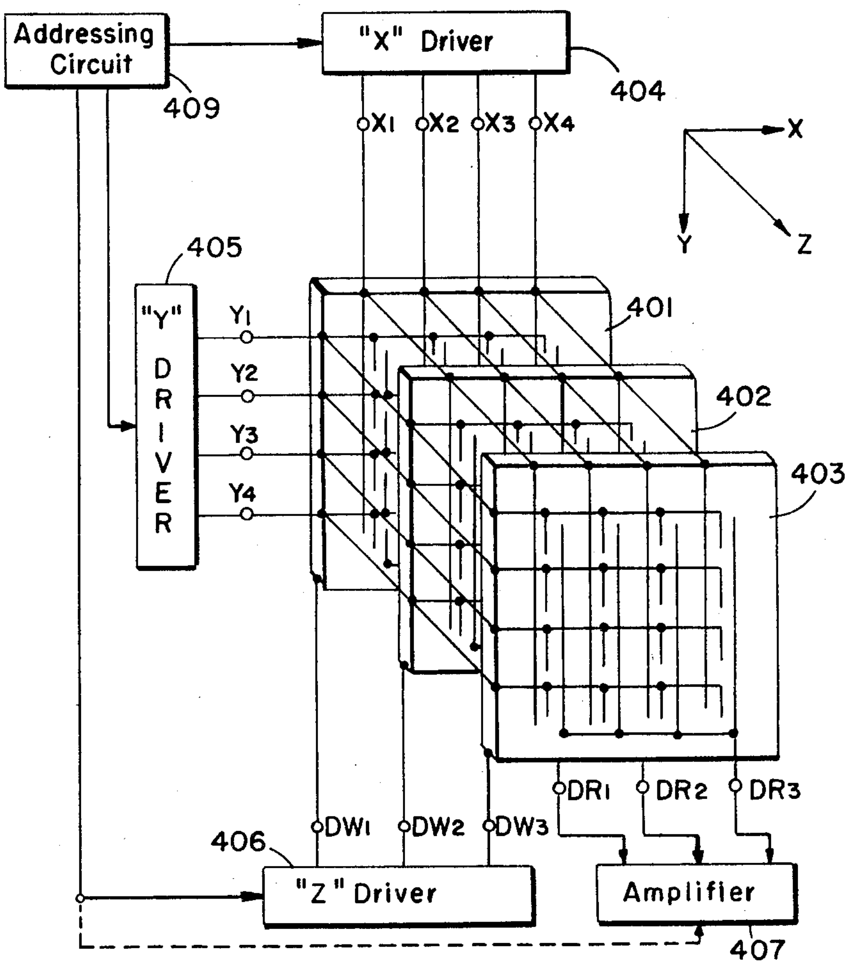
Figure 6A:
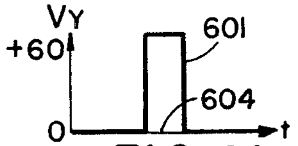
Figure 7A:
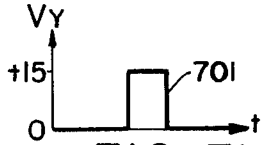
Figure 6B:
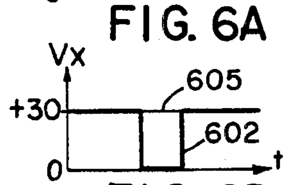
Figure 7B:
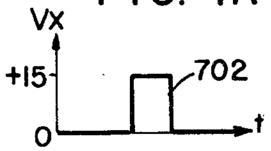
Figure 6C:
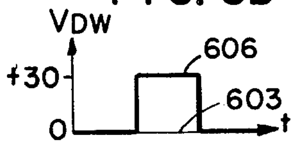
Figure 8A:
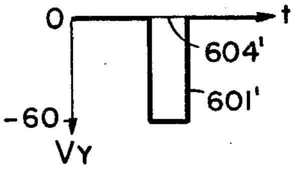
Figure 9A:
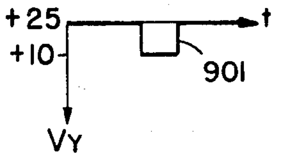
Figure 8B:
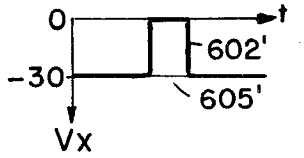
Figure 9B:
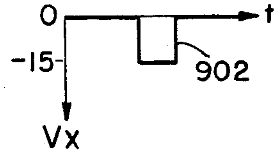
Figure 8C:
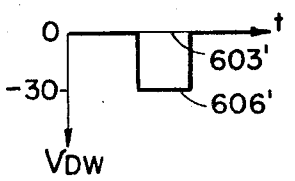
Figure 9C:
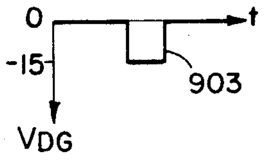
Figure 11A:
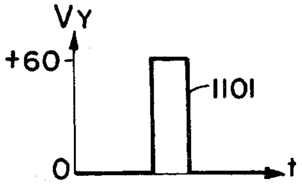

FIGS. 3A and 3B graphically illustrate the static characteristic of the semiconductor element shown in FIG. 2;

FIG. 4 is a circuit diagram of a preferred embodiment of the memory of this invention;

FIG. 5 is a circuit diagram of a single memory board according to the invention;

FIGS. 6A–6C illustrate voltage waveforms for explaining a write operation on the memory of this invention;

FIGS. 7A and 7B illustrate the voltage waveforms obtained in a read-out operation of the memory of this invention;

FIGS. 8A–8C illustrate the waveforms for explaining a write operation of a modified form of the memory of this invention;

FIGS. 9A–9C illustrate voltage waveform for explaining the read operation of the modified memory of this invention;

FIG. 10 is a circuit diagram of a single memory board according to another embodiment of this invention; and FIGS. 11A–11C and FIGS. 12A through 12C show voltage waveforms of a memory according to another embodiment of this invention.

Figure 1A:
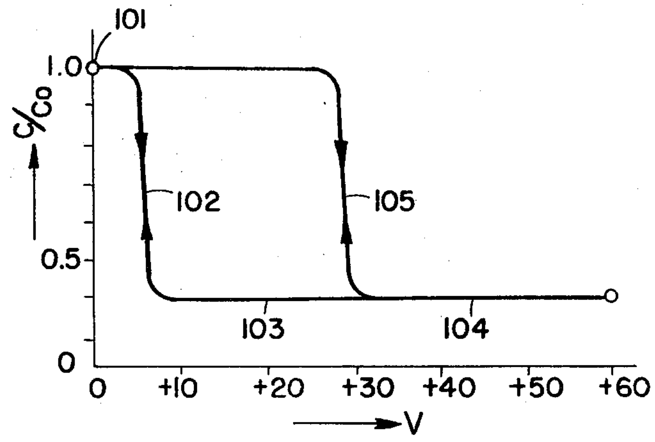
FIGS. 1A and 1B are graphical representations of the capacitance—applied voltage characteristics of a semiconductor element of the type employed in the memory of this invention.
Figure 1B:
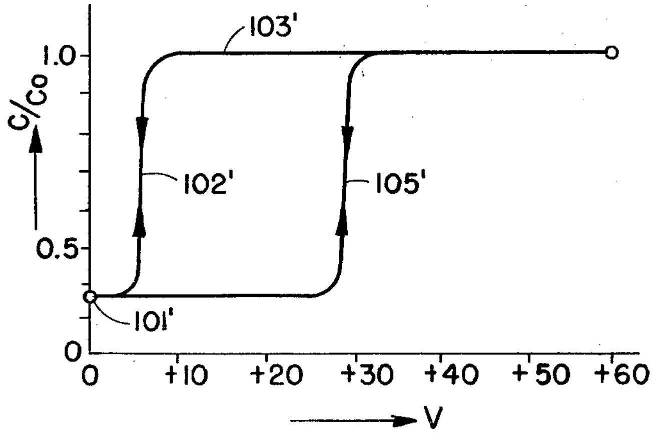

FIGS. 1A and 1B illustrate the capacitance-voltage characteristic curves of MIS-type structures fabricated by using P-type silicon of a specific resistance of 2 ohm-cm., and N-type silicon of a specific resistance of 1 ohm-cm. as substrates. Alumina films including a permanent trapping center are deposited on respective substrates in vapor phase, the alumina films are coated with aluminum gate electrodes, and electrodes are contacted to the respective substrates. More specifically, those characteristic curves are shown in the drawings with the normalized capacitance C/Co of the respective MIS structure between both surfaces of the insulator film being plotted on the ordinate, and the voltage V applied to the aluminum gate electrode with respect to the substrate electrode being plotted along the abscissa. The alumina film of the sample is one having been vapor-grown by introducing onto the silicon substrate heated to about 850° C. a mixed gas consisting of aluminum chloride of 0.5 mol%, carbon dioxide gas of 1.5 mol%, and hydrogen of 98 mol%, and having a thickness of 1,800 A. In these MIS-type structures, a critical value necessary for the permanent trapping center in the alumina film to capture electrons is given by applying a voltage of +40 volts or −25 volts to the aluminum gate electrode with respect to the silicon substrate.

The capacitance-applied voltage characteristic of the MIS structure employing a P-type silicon substrate is obtained as shown in FIG. 1A, by applying a gradually increasing voltage of +30 volts lower than the critical value, and a gradually increasing voltage of +60 volts higher than the critical value to the sample. The structure shows the accumulation state 101 under a zero bias condition. As the voltage is increasingly applied in a positive direction from the initial state 101, it reaches the inversion state 103 through the initial curve 102, and, if the applied voltage is decreased after a few minutes, it returns to the initial state 101 also through curve 102. Therefore, it will be understood that the trapping of electrons in the alumina film does not occur when the applied voltage is only about +30 volts. However, if the sample is kept free for about 1 minute in the inversion state 104 of the applied voltage of +60 volts, a characteristic curve 105 displaced in the positive direction in the order of about 20 volts is obtained. The shifted characteristic obtained by applying a voltage above the critical value is remarkably stable, and can be easily distinguished from the initial characteristic by applying a suitable voltage lower than the critical value to the gate electrode. Moreover, it is easy to displace the characteristic sufficiently in order to increase the noise margin.

FIG. 1B illustrates the capacitance-applied voltage characteristic on the MIS structure employing an N-type silicon substrate, in which the inversion state 101′, the initial characteristic curve 102′, the accumulation state 103′, and the displaced characteristic curve 105′ after having captured electrons, are obtained through a voltage applying operation similar to that employed in obtaining the characteristics of FIG. 1A.

Referring to FIG. 2, and MIS-type transistor utilizing the characteristic shown in FIGS. 1A and B for an insulated gate is fabricated by diffusing in vapor phase within a silicon substrate 201 of one conductivity type, drain and source regions 202 and 203 of the opposite conductivity type. The substrate surface is then coated with a thin silicon dioxide film 204 and an alumina film 205, and a gate electrode 206 and interconnections 207 and 208 are provided over insulating films 204 and 205 in respective ohmic contact with the drain and source regions 202 and 203. A substrate gate electrode 209 is formed in ohmic contact with the undersurface of substrate 201. The vapor-growing of the alumina film 205 is identical as that described above, and its thickness is 1,800 A. Moreover, silicon dioxide film 204 may be formed by a thermal oxidation growth process or by a vapor growth process and may have a thickness within the range of between and 0–500 A., as the occasion demands. Furthermore, the channel length and the width of the transistor are, respectively, 7$\mu$ and 300$\mu$.

FIG. 3A illustrates an N-channel type operation obtained when a P-type silicon substrate of 2 ohm-cm. in specific resistance is substituted for in the above mentioned MIS-type transistor, with the ordinate depicting the drain current $I_{DS}$ and the abscissa depicting the gate voltage $V_{GS}$. The voltage between the drain and source regions during measurement is +15 volts. The characteristic curve 301 of FIG. 3A is the characteristic observed when the silicon dioxide film 204 of the transistor shown in FIG. 2 has a thickness of 200 A., and represents the initial characteristic when a gate voltage exceeding the critical value is not applied to the insulated gate film of the transistor. Characteristic curve 302 is the characteristic obtained after a voltage exceeding the critical value is once applied to the gate film. Characteristic curve 302 is obtained by applying an AC voltage at a commercial frequency of about 50 volts in effective value to gate electrodes 206 and 209 for about 20 seconds to cause electrons to be injected into the permanent trapping center of alumina film 205. Since this MIS-type transistor is of the type in which the operating point on characteristic curve 301 in a depletion region can be displaced to a characteristic shown by curve 302 in an enhancement region by applying an electric field to the transistor. This transistor is preferably used as a unit memory element of a memory device or memory matrix taking advantage of the bistable characteristic of the conventional electronic circuit. In addition, since the written information is not lost through an electric treatment during read-out, a small size, highly-reliable integrated memory circuit for nondestructive read-out can be realized.

Moreover, the characteristic of an N-channel MIS-type transistor in the initial state of the MIS structure without the silicon dioxide film is represented by characteristic curve 303 in the enhancement region. In an MIS-type transistor having a thus simplified structure, the gate threshold voltage also tends to take an operation characteristic higher than characteristic curve 302 in response to electrons being captured within the alumina film, so that, by applying a gate bias from the initial characteristic to the placement characteristic, the characteristics of the transistor can be readily discriminated.

FIG. 3B further illustrates the relationship between the drain current $I_{DS}$ and the source voltage $V_{GS}$ of a P-channel insulated gate type field-effect transistor obtained by employing an N-type silicon body of 1 ohm-cm in specific resistance. As in FIG. 3A, the individual characteristic curves 301', 302' and 303' of FIG. 3B are, respectively, the initial characteristic, the characteristic after having an AC voltage of 50 volts exceeding the threshold value applied thereto, and the initial characteristic when the silicon dioxide film is not interposed. This transistor is also suitable for use as a memory device.

Referring now to FIG. 4, a preferred embodiment of this invention is shown in which a memory device comprises a plurality of memory matrix boards 401, 402, and 403. Addressing the matrix boards for performing a write or read-out operation is accomplished by an X or column driver 404 for selecting one of the X drive lines, $X_1$, $X_2$, $X_3$ and $X_4$ on the boards obtained by connecting the corresponding column lines of the matrix boards; a Y or row driver 405 for selecting one of the Y drive lines $Y_1$, $Y_2$, $Y_3$ and $Y_4$ obtained by connecting the corresponding row lines of the matrix boards; and a Z driver 406 for selectively altering the potentials of body electrodes $DW_1$, $DW_2$, $DW_3$ of the respective matrix boards 401, 402 and 403 to a reference potential. An amplifier 407 receives the output signals from output terminals $DR_1$, $DR_2$, $DR_3$ of the respective matrix boards 401, 402 and 403.

Each of the matrix boards is provided with a substantially identical semiconductor integrated circuit structure, and has a single MIS-type transistor having the memory function described above at each of the matrix intersecting points formed by the row and column drive lines $Y_1$–$Y_4$, and $X_1$–$X_4$. That is, this memory device is a parallel type semiconductor memory device with a number of three-dimensionally arranged memory bits. As will be described hereinafter, each of the drivers 404, 405 and 406 can respectively select either of the X, Y or Z addresses in response to a command pulse from an addressing circuit 409. Addressing is commonly performed in the write operation, by selecting each of the drive lines by the use of the X driver 404, the Y driver 405, and the Z driver 406, as shown by the solid lines in the drawing, and, in the read operation, by letting the respective body electrodes $DW_1$, $DW_2$, and $DW_3$ be at reference potential, and by selecting the matrix output terminals $DR_1$, $DR_2$, and $DR_3$ for read-out signals by the use of the read amplifier 407 together with the X driver 404 and the Y driver 405.

Each of the matrix boards 401–403 comprises a large scale integrated circuit of a stacked type or of a multi-chip type arranged on a common substrate. The three-dimensional write and read operations will be explained hereinafter with reference to a specific memory circuit and the voltage waveforms developed at its respective points.

Referring to FIG. 5, there is shown a memory matrix board adaptable for use in the memory of FIG. 4. That board is in the form of a memory integrated circuit comprising MIS-type memory transistors $T_i$ each having as its gate insulating film and an alumina film including the permanent trapping center described above. These transistors are arranged in respective matrix intersecting points formed by column drive lines 501, 502, and 503, and row drive lines 504, 505, and 506.

Each memory transistor $T_i$ is further identified by the row-column intersection or address at which it is located, e.g., transistor $T_{i23}$ is located at the intersection of row 2 and column 3.

The electrodes of the MIS-type transistors in a given row are connected so that their gate electrodes are connected to the corresponding row drive lines 504, 505, or 506, and the drain and source electrodes of the memory transistors in a given column are connected to the corresponding column drive lines 501, 502 or 503 and the column read lines 507, 508 or 509.

The row drive lines 504, 505 and 506 are connected in common with the corresponding row drive lines of the other matrices at an external circuit, and are coupled to the Y drive lines $Y_1$, $Y_2$ and $Y_3$. The column drive lines 501, 502 and 503 are coupled through resistive elements $R_{L11}$, $R_{L12}$, $R_{L13}$ as well as those of the other matrices to the X drive lines $X_1$, $X_2$, $X_3$. The read lines 507, 508, 509 provide, respectively, source inputs to gate transistors $Q_{G11}$, $Q_{G12}$, and $Q_{G13}$. The drain electrodes of the gate transistors are connected in common and are coupled to the read output terminal $DR_1$ of the matrix board on which they are located. The gate electrodes of these transistors are connected to column drive lines 501, 502 and 503, respectively. In addition, the substrate gate electrode common to the memory transistors Ti are in ohmic contact with the silicon substrate of the matrix board at a substrate electrode $DW_1$. Although in the monolithic integrated circuit all of the memory transistors Ti are of the same type, each of the gate transistors $Q_{G11}$, $Q_{G12}$, $Q_{G13}$ used in the matrix board are also of the same type using alumina film as the gate film, but may be of conventional MIS-type transistor employing a gate film of silicon dioxide of the type not including the trapping center because these transistors are not used as memory function transistors. If desired, the gate transistors may be provided in an external circuit the respective matrix board. The resistive elements $R_{L11}$, $R_{L12}$, $R_{L13}$ may also be provided in the external circuits, and, in this case, may be replaced by equipment resistive connection circuits of the MIS-type transistors. Moreover, the gate transistors can be replaced by bipolar transistors.

Referring to FIGS. 6A–C, a selective write operation to a given address of the three-dimensional matrix employing N-channel type memory transistors having the characteristic shown in FIG. 3A with a critical voltage of +35 volts, for example, is performed by applying a drive pulse 601 of +60 volts with a duration of 50 ms. to a given Y drive line, and applying a negative drive pulse 602 to a given X drive line which lowers the normal drive line voltage from +30 volts to 0 volts in synchronism with the pulse 601. The substrate electrode of a given matrix board is maintained at a reference potential of 0 volts. Thus, in each memory transistor supplied with such voltage, an N-type channel is created between its drain and source in response to pulse 601 on the selected Y drive line, the potential difference between this N-type channel and pulse 601 being a voltage that is applied to its gate insulating film. In a given, selected memory transistor, this potential difference is the one between pulse 601 and pulse 602 on the X drive line in phase with the former, and the memory transistor is supplied with a voltage of +60 volts which generates an electric field exceeding the critical level. As a result, the critical voltage characteristic of the gate is displaced from +5 to +20 volts.

On the other hand, the unselected or unaddressed memory transistors are in the state wherein at least one of the gate electrodes connected to the Y drive line, the drain electrode connected to the X drive line, and the substrate electrode is at the reference potential 604 of 0 volt, at the normal drain potential 605 of +30 volts, or in the state wherein an inhibit pulse 606 (FIG. 6C) is supplied which raises the substrate potential up to +30 volts while the pulse 601 is applied. If the Y drive line is at the reference potential 604, of course, a voltage higher than the critical voltage is not applied to the gate film. If the drain voltage is at the normal potential 605 of +30 volts, the gate film is supplied with a difference voltage of +30 volts at the most which is lower than the critical voltage, because the potential of the induced channel is conductively connected to the drain region and becomes +30 volts even though the pulse 601 of +30 volts is applied to the gate electrode. If the inhibit pulse 606 is applied to the substrate at the time when the drive pulse 602 is applied to the X drive line, a forward current flows through the drain junction of the memory transistor connected to this drive line. As a result of this current, a voltage drop is produced across the resistance element connected to this X drive line, the potential of the drain region connected to this X drive line via the resistance element becomes substantially identical to the inhibit pulse 606, and the channel potential also becomes identical to the inhibit pulse 606.

Accordingly, the gate films of the memory transistors mounted on the matrix board supplied with the inhibit pulse 606 have a difference voltage of +30 volts applied thereto between the drive pulse 601 on the Y drive line and the inhibit pulse 606, and, since this voltage is less than the critical voltage, a write-in operation is not performed on this matrix board. In this selective write operation, it is preferable that the inhibit pulse 606 has a relatively long time duration with respect to the drive pulse 601 on the Y drive line in order to reduce disturbances during the write operation.

FIGS. 7A and 7B, respectively, illustrate the voltage wave forms on the Y drive line, and X drive line of each matrix board during a three-dimensional read-out operation. In these drawings, as in FIG. 6, matrix boards comprising the N-channel type memory transistors and the gate transistors are assumed. That is, it is possible to read parallely the information written in the memory transistors of selected X–Y addresses through the read output terminals of the respective matrix boards by maintaining all the substrate electrodes of the matrix boards at zero potential, applying a read pulse 701 (FIG. 7A of +15 volts to a selected Y drive line in the range between the gate threshold voltages of the initial characteristic 303 and the dislocation characteristic 302 shown in FIG. 3A, and supplying a read pulse 702 (FIG. 7B) of +15 volts to a selected X drive line. During a read-out operation, the gate transistors connected to the selected X line are placed in the conductive state. Accordingly, from an embodiment having a structure such as that shown in FIG. 4 and utilizing six matrix boards, it is possible to read the information stored in the selected matrix intersecting points of the matrix boards six bits at a time. The memory transistor at a matrix intersecting point selected in the manner described above shows, at the time when the pulse 702 is applied to the X drive line, exhibits a low impedance at its output terminal if the transistor is in the initial characteristic, and a high impedance if it is in the displacement characteristic. As a result, the characteristic of the memory transistor, that is, the stored information thereat, can be easily distinguished by the amount of the readout current.

On the other hand, in the unselected matrix intersecting points, at least one of the X and Y drive lines passing that intersecting point is not supplied with pulses 701 or 702, so that the drain current does not flow through the memory transistor located at that point.

FIGS. 8A–C and FIGS. 9A–C respectively illustrate the voltage waveforms utilized during a write-in operation and a read-out operation when the matrix boards employing P-channel type memory transistors are employed according to the embodiment of FIG. 4. As shown in FIG. 8, the write-in operation can be performed in the same manner as above by the use of pulse signals 601′, 602′, 603′, etc., which are of opposite polarity in comparison with those pulse signals used in the memory employing N-channel type transistors shown in FIG. 6.

Further, in the read operation, the property of the memory transistor owing to the electron trapping phenomenon behaves, as shown in FIGS. 3A and B, in the manner in which the characteristics of an N-channel type and P-channel type transistors vary in the enhancement mode region and the depletion mode region, respectively, so that, in order to cause a transistor having the displacement characteristic 302′ shown in FIG. 3B to operate in the enhancement mode in the case of the P-channel type transistor, it is necessary to provide a voltage system for applying a bias potential in the order of +25 volts to the gate electrode with respect to the body electrode. Therefore, as shown in FIG. 9, a read operation of the matrix board employing the P-channel transistors is performed, by placing the substrate electrode of the matrix board at a reference potential, applying a negative read pulse 901 to a given Y drive line with respect to that electrode which decreases from +25 volts in the normal state to a value in the range of +15 to +10 volts serving as a gate bias between the displacement characteristic and the initial characteristic, applying a read pulse 902 of −15 volts to a given X drive line, and supplying a gate pulse 903 of −15 volts to the gate terminal of each matrix which changes the gate transistor to the conductive state. Under such a voltage application, a memory transistor supplied with pulse 901 shows a low impedance if it has the displacement characteristic, or a high impedance if in the initial characteristic. Therefore, in this read operation an inverted output is produced in contrast to the case of the matrix employing P-channel type transistors.

Referring to FIG. 10, another memory matrix board applicable to the memory device of this invention shown in FIG. 4 has a structure in which MIS-type transistors (drive transistors) $Q_{t11}$, $Q_{t12}$, $Q_{t13}$ . . . not possessing the general memory function and MIS-tYpe transistors (memory transistors) $T_{t11}$, $T_{t12}$, $T_{t13}$, . . . having a memory function are arranged in respective matrix intersecting points formed by the X drive lines $X_1$, $X_2$, and $X_3$ and the Y drive lines $Y_1$, $Y_2$, and $Y_3$. As shown in the drawing, at each matrix intersecting point, the gate electrode and the source electrode of the drive transistor are respectively connected to the X and Y drive lines passing its intersecting point, and the drain electrode of the drive transistor is connected to the gate electrode of the memory transistor $T_{t11}$, $T_{t12}$ etc., located at each row-column intersection or address. The drain and source electrodes of the respective memory transistors are connected in common and are coupled to the output terminals $DR_t$, $DR'_t$ unique to each of the matrix boards. Furthermore, though the substrate electrode $DW_t$ common to each transistor $Q_t$ and $T_t$ is coupled out on each matrix board, the body electrode DW of each matrix board in a memory device employing a plurality of such matrix boards is always maintained at ground potential, and the three-dimensional addressing during the write and read operations is performed by means of the X and Y drive lines and the output terminals DR and DR′.

Figure 11C:
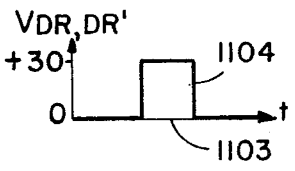

FIGS. 11A–C and FIGS. 12A–C are voltage waveform diagrams utilized during the write and read operation in the memory device of this invention employing a plurality of matrix boards of the type shown in FIG. 10. The waveforms shown are for use with a matrix board employing N-channel type transistors. That is, as shown in FIG. 11, a write pulse 1101 of +60 volts, which becomes a gate voltage higher than the critical voltage for the memory transistor, is applied to a given Y drive line at a time of effecting selective writing, and a drive pulse 1102 of +70 volts sufficient to change the drive transistor connected to a given X drive line to the conductive state is applied to that X drive line. In addition, the selection of each matrix board in the Z direction is performed by keeping the output terminal of the selected matrix board connected to the drain and source electrodes of the memory transistors at a zero potential 1103, such as the substrate electrode, and supplying an inhibit pulse 1104 of +30 volts to the output terminals of the other matrix boards. As a result of applying these voltages, a gate voltage is not applied to those memory transistors located at the matrix intersecting points through which unselected row and column drive lines pass. Moreover, the memory transistors located at the selected matrix intersecting points of the unselected matrix boards are supplied at their respective gate films with a difference voltage of 30 volts which is the difference between the gate pulse 1101 and the inhibit pulse 1104 providing for a channel potential, but, those transistors are not selected because this difference voltage does not reach the critical value. It is preferable, as shown in FIG. 11C, that in order to prevent mis-writing the inhibit pulse 1104 have a longer duration than at least one of the X and Y drive line pulses.

In the embodiment of FIG. 10, the unit memory function is also provided by a single memory transistor. Further, although there is an increased number of structural elements as compared to the memory device of FIG. 5 which was constructed on the ratio of one element to one bit, there is no need in the FIG. 10 device of incorporating a resistance element for providing a voltage drop in the X drive lines. It is thus possible to perform the write operation with a reduced drive power. Furthermore, owing to the gating action of the drive transistor, it becomes possible to increase the reliability in the write operation and high-speed writing thus becomes possible.

Figure 12A:
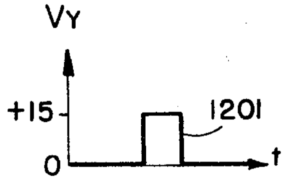
Figure 11B:
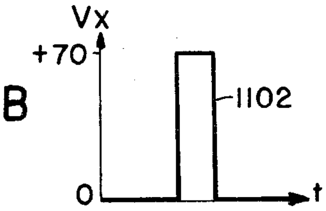
Figure 12B:
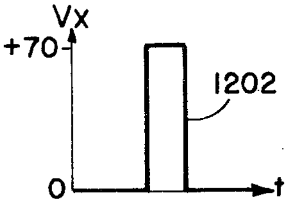
Figure 12C:
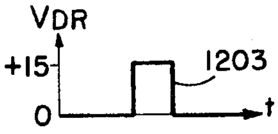

Referring to FIGS. 12A–C, the read operation of the embodiment of FIG. 10, is performed by applying a read pulse 1201 of +15 volts between the gate threshold voltages of the initial characteristic and the displacement characteristic of the memory transistor to a given Y drive line, applying a drive pulse 1202 of +70 volts sufficient to change the drive transistor to a conductive state to a given X drive line, and supplying a drain voltage pulse 1203 of +15 volts to one of the output terminals of a selected matrix board. In this read operation, if the characteristic of the memory transistor positioned in the address of a given X–Y plane is the initial characteristic, a drain voltage pulse 1203 of +15 volts appears at the other output terminal, or if it is the displacement characteristic this pulse 1203 occurs at a reduced level.

The memory device of this invention described herein does not receive a voltage application which forms an electric field exceeding the critical level to the gate film of the memory transistor during the read operation, and thus, does not vary its property even though this operation is performed repeatedly. Accordingly, the memory device of this invention reliably provides nondestructive read-out. Moreover, since the write and read operations are performed electrically, the device receives little disturbance during operation in comparison to magnetically operative memory devices, and thus has a high reliability with high-speed operation. In addition, the memory device of this invention may take the form of a cubic integrated circuit wherein a plurality of memory matrix boards are stacked on one another, or the form of a large scale integrated circuit of a multi-chip type wherein the boards are arranged on one plane of a common wiring substrate. In a large capacity memory circuit with such forms, the memory device of this invention capable of performing the three-dimensional addressing requires a relatively few electrode terminals for connection to an external circuit irrespective of the increased capacity, and it is thus easy to avoid the drive circuit or amplifier circuit from becoming complex.

While only several embodiments of the invention are herein specifically described, it will be understood that modifications can be made therein all without departing from the spirit and scope of the invention.

What is claimed is:

1. A memory device comprising a plurality of memory matrix boards, each of said boards including a plurality of memory elements arranged in intersecting rows and columns, the intersection of a row and a column defining a memory address, said memory elements each comprising an MIS-type memory transistor having an interposed insulating material film capable of storing an electric charge in response to an application of a voltage exceeding a critical value, an electrode terminal on each of said boards, said MIS-type transistors each being connected in the matrix board for operation in response to signals applied to the row and column drive lines passing its matrix intersecting points and to the electrode terminal peculiar to that matrix board, the drive lines in corresponding rows of said matrix boards being coupled together to define common row drive lines, the drive lines in corresponding columns being coupled together to define common column drive lines, and said electrode terminals peculiar to respective ones of said matrix boards being led out to form a terminal group, row select means coupled to said common row drive lines, column select means coupled to said common column drive lines, board select means coupled to said electrode terminal group and addressing means coupled to said row, column, and board select means for providing addressing select signals thereto, said addressing means comprising means for applying a first voltage to a selected one of said row drive lines, and a second voltage to a selected one of said column drive lines, said first and second voltages being effective to establish a unique voltage at the selected memory transistor exceeding said critical value, and means for inhibiting the formation of said critical voltage-exceeding voltage at the selected address at all of said boards other than the selected one of said boards, whereby said MIS-type transistor located at an address can be selected three-dimensionally by means of said common row and column drive lines and said terminal group.

2. The memory device of claim 1, further comprising a read-out terminal on each of said boards, and an amplifier coupled to said read-out terminals.

3. The memory device of claim 1, further comprising a plurality of gate transistors each having a first output terminal coupled to an output terminal of said memory transistors arranged in common in a corresponding one of said row and columns, and a second output terminal coupled to said board read-out terminal.

4. The memory device of claim 3, in which said memory transistors in a given row each have their gate terminals coupled in common to the corresponding one of said row drive lines, and first and second output terminals coupled respectively to the first and second output terminals of the other of said memory transistor in a given column, one of said output terminals being coupled to one of said column drive lines, and another of said output terminals being connected to an output terminal of said gate transistor in said given column.

5. The memory device of claim 3, further comprising resistance means coupled between said common-coupled one of said output terminals and said column drive lines.

6. The memory device of claim 3, in which said gate transistors each further comprise a gate terminal coupled to one of said row and column drive lines.

7. The memory device of claim 6, further comprising resistance means coupled between the gate terminal of each of said gate transistors and said one of said row and column lines.

8. The memory device of claim 1, in which said inhibiting means comprises means for applying an inhibit signal to said board, and resistance means coupled to one of said row and column drive lines and effective in response to the presence of said inhibit signal to produce a signal causing the signal applied to the memory transistor to be less than said critical voltage.

9. The memory device of claim 8, in which said row and column addressing and said inhibit signals are pulses, said inhibit pulse being of a greater duration than said addressing signals.

10. The memory device of claim 1, further comprising gate transistors coupled to each of one of said row and column drive lines, said addressing means further including readout means including means to selectively render conductive said gate transistor coupled to said selected one of said row and column lines.

11. The memory device of claim 1, further comprising drive transistors interposed between said one of said row and column drive lines and said memory transistors.

12. The memory device of claim 11, in which said drive transistors include a gate terminal coupled to one of said row and column drive lines, a first output terminal coupled to the other of said row and column drive lines, and a second output terminal coupled to the gate terminal of one of said memory transistors.

13. The memory device of claim 12, in which the corresponding output terminals of said memory transistors in a given column are coupled to said electrode terminal.

14. A memory device utilizing MIS type memory transistors comprising; a plurality of memory matrix boards, each of the boards including a plurality of memory elements arranged in intersecting rows and columns, the intersection of a row and column defining a memory address, said memory transistors each using an alumina film as a gate insulator and being of the N-channel enhancement type, said alumina film being capable of essentially permanently storing electrons in response to an application of a voltage exceeding a critical value, the gate, drain and source electrodes of each of said memory transistors being respectively connected to a row drive line, a column drive line and column read line, a substrate electrode of each of said memory transistors being led out in common, the row and column drive lines in corresponding rows and columns of said matrix boards being electrically connected together to respectively define common row and column drive lines, row selection means coupled to said common row drive lines for applying a positive drive pulse to the predetermined row line, column selection means coupled to said common column drive lines for selecting the predetermined column drive line, means maintaining the other column drive lines at a certain voltage such that the voltage difference between said predetermined row and column lines exceeds said critical voltage and the voltage difference between said predetermined row and said other column lines being less than said critical voltage, and board selection means coupled to the terminals of respective substrate electrodes for applying write-in voltages to said boards, said write-in voltages only exceeding said critical voltage at the memory transistor in the selected board at the location of the predetermined row and column.

* * * * *